US005169585A

United States Patent [19]

Le Gourrierec

[11] Patent Number: 5,169,585

[45] Date of Patent: Dec. 8, 1992

[54] METHOD AND DEVICE FOR FABRICATING POSTS MADE OF CONCRETE OR THE LIKE WITH POLYGONAL CROSS SECTION

[76] Inventor: Rolland Le Gourrierec, 56 rue de la Tremblaie, F-35510 Cesson Sevigne, France

[21] Appl. No.: 689,043

[22] PCT Filed: Nov. 15, 1989

[86] PCT No.: PCT/FR89/00585

§ 371 Date: May 15, 1991

§ 102(e) Date: May 15, 1991

[87] PCT Pub. No.: WO90/05622

PCT Pub. Date: May 31, 1990

[30] Foreign Application Priority Data

Nov. 15, 1988 [FR] France ............ 88 14809

[51] Int. Cl.[5] ............ B28B 7/34; B28B 7/36; B29C 33/20; E04B 1/16

[52] U.S. Cl. ............ 264/219; 156/245; 249/48; 249/51; 249/112; 249/114.1; 249/115; 249/134; 249/135; 249/139; 249/143; 249/164; 264/31; 264/313; 264/316; 264/333; 264/334; 264/337; 264/338

[58] Field of Search ............ 264/31-35, 264/333, 267, 313, 316, 317, 219, 334, 337, 338; 249/48, 51, 143, 112, 114.1, 115, 134, 135, 139, 164; 156/245

[56] References Cited

U.S. PATENT DOCUMENTS

| | | | |
|---|---|---|---|
| 971,554 | 10/1910 | Parsons | 249/51 |
| 1,171,491 | 2/1916 | Woods | 249/51 |
| 2,505,426 | 4/1950 | O'Flaherty | 264/31 |
| 2,991,533 | 7/1961 | Reid et al. . | |
| 3,329,747 | 7/1967 | Veach | 264/31 |
| 3,350,049 | 10/1967 | Reiland . | |
| 3,479,704 | 11/1969 | Reed | 264/267 X |
| 3,831,898 | 8/1974 | Sachs | 249/161 X |
| 3,942,753 | 3/1976 | Sachs . | |
| 3,964,944 | 6/1976 | Gwynne | 264/333 X |
| 4,023,766 | 5/1977 | Lubov | 249/48 |
| 4,083,526 | 4/1978 | Hatfield . | |
| 4,147,818 | 4/1979 | Hatfield . | |
| 4,595,168 | 6/1986 | Goodwin | 249/DIG. 2 X |
| 4,842,241 | 6/1989 | Fitzgerald et al. | 249/48 X |
| 4,887,789 | 12/1989 | Harris et al. | 249/51 X |
| 4,957,270 | 9/1990 | Rummage et al. | 249/DIG. 2 X |

FOREIGN PATENT DOCUMENTS

| | | | |
|---|---|---|---|
| 0006080 | 12/1979 | European Pat. Off. . | |
| 1453489 | 9/1966 | France . | |
| 1513315 | 2/1968 | France . | |
| 25253 | of 1911 | United Kingdom . | |
| 648809 | 1/1951 | United Kingdom . | |
| 728736 | 4/1955 | United Kingdom | 264/267 |
| 1551011 | 8/1979 | United Kingdom . | |

*Primary Examiner*—Karen Aftergut

[57] ABSTRACT

A method and device for fabricating posts made of concrete having a polygonal cross-section includes the steps of providing and opening an integral liner, applying backing panels to the liner, holding the panels together with a hooping means, and pouring and hardening concrete in the integral liner. The liner is collapsible and preformed to open in the shape of a right prism with an internal section identical to that of the post to be manufactured. Backing panels made of cardboard or plastic material support the external faces of the liner and entirely cover the external faces of the liner. At least one of the backing panels is adhered to an external face of the liner. A hooping means holds the liner and the backing panels assembled in mutual contact during the use of the device.

11 Claims, 2 Drawing Sheets

METHOD AND DEVICE FOR FABRICATING POSTS MADE OF CONCRETE OR THE LIKE WITH POLYGONAL CROSS SECTION

BACKGROUND OF THE INVENTION

The present invention concerns a process and a device for the manufacture of posts of concrete or the like, of polygonal cross section.

It is known that the preparation of concrete structural elements involves the use of forms of wood or metal in which the concrete is poured and where it is left to harden. These forms are expensive and heavy and difficult to handle. Furthermore, on the worksites the operations of setting and stripping forms are often difficult.

In the case of simple pieces such as posts, it has already been proposed to cast the concrete in simple cardboard sheaths. The tests performed for posts of circular section have proven perfectly satisfactory, and this process is now employed in the art. It offers the advantage of being very easy to employ and of being much less expensive than the ordinary methods using complex forms.

Despite these advantages, it has not been possible, however, to apply this process to the production of posts of polygonal (square, rectangular or other) cross section, for in every case the cardboard sheath used deforms by sagging to assume a circular or rounded section.

To remedy this problem, it has been proposed, in FR-A-1 453 489, to make use of a cardboard form of polygonal section, which is reinforced by applying boards to its external faces, these boards being held in position against the faces of the form with the aid of clamps.

GB-A-648,809 has also proposed using for this purpose a form of polygonal section constituted by a plaster panel gripped between two carboard boards, this panel having parallel folding lines enabling it to be folded to form a liner which is externally sheathed in a protective sheet of paper, fabric, leather etc.

All these processes, however, are expensive and difficult to employ.

The present invention aims to remedy this problem by proposing a process for making concrete posts of polygonal cross section that will be as easy to employ as the cardboard sheath process used for the manufacture of posts of circular section, that will not be more expensive than the latter, and which will use, for the pouring of the concrete and for setting it, not a wooden form but a simple liner which does not deform.

SUMMARY OF THE INVENTION

The subject matter of the invention is a process for making posts of concrete or the like of polygonal cross section, characterized in that the concrete is poured and allowed to set in an integral liner in the shape of a right prism, having an internal section identical to that of the post, this liner being duplexed externally on all its faces to backing panels of a rigid or semi-rigid material which cover the said faces, and at least one of which adheres to an external face of the liner, the liner and the associated backing panels being held together in contact with one another, in the position of use, by hooping means or the like.

The invention also has as its subject matter a device for making posts of concrete or the like, of polygonal cross section, characterized in that it includes an integral liner in the form of a right prism having an internal section identical to that of the post, backing panels of a rigid or semi-rigid material adapted to be applied against the external faces of the liner to cover them on their entire surface, one of which adheres to one external face of the liner, and hooping means or the like adapted to hold the liner and the associated backing panels in contact with one another during the employment of the device.

The posts of concrete or the like of polygonal cross section made by the process or with the aid of the device defined above constitute another subject of the invention.

The liner used can be of cardboard, plain or corrugated, treated if desired with any means known in itself, of special cardboard including flat cover sheets of cardboard between which is interposed at least one armature other than a corrugated sheet, or again, a plastic material such as polyethylene, an expanded high-density plastic material, rotary-cut wood veneer, or the like.

Advantageously, the liner is in the form of a unit that can be folded flat by bending it on folding lines or creases coinciding with the arrises of this liner. The liner can be derived from a single blank of cardboard appropriately cut and creased, whose two free margins parallel to the folding lines will be brought substantially into edge-to-edge contact with their adjacent portions glued to a same backing piece.

These pieces can be contiguous with one another two-by-two to form a planar structure in which areas of lesser thickness define the folding lines separating the different elements, the liner being glued at one external face to one of these elements. In the case where the liner has a square rectangular cross section or one in the form of a parallelogram, the assembly thus formed will be able to be delivered flat to the users after the liner has been folded.

In another embodiment, two backing panels can adhere to two parallel external faces in the position for the use of the liner, to form a flat-folding assembly, the other backing elements being removable and applied to the corresponding faces of the liner at the time of use. In the case of a liner of square or rectangular cross section, the backing panels glued to two parallel faces of this liner can advantageously overlap with respect to these faces by a distance at least equal to the thickness of the panels, whereas the other elements will have a width exactly equal to that of the other faces of the liner, so as to have their edges in contact with the overlapping portions of the contiguous panels when in the position of use, and to be thus gripped between these portions.

The hooping means can be simple metal or plastic straps.

In another embodiment, two of the backing panels will adhere to two parallel external faces, in the position of use, of a first integral liner in right-prism form, while the other backing panels will adhere to internal faces of a second integral liner constituting the hooping means, the two liners equipped with their backing panels cooperating by the fitting of the first liner into the second liner.

In this embodiment, additional hooping means such as straps can also be provided.

In all of the embodiments, folding flaps can, of course, be provided at each end of the liner to mask the internal structure.

Of course, other embodiments of the device according to the invention can be conceived by a person of ordinary skill in the art without departing from the scope of the invention.

This device is distinguished from wooden or metal forms of the prior art by its extreme simplicity, its lightness, and its ease of use on the worksites, where its placement in position for use is performed very simply, without the use of special tools or requiring special handling apparatus.

It will be noted, furthermore, that after the concrete post has been made, the liner can be separated from it by tearing it off, but that the elements of plastic material and the hooping means are not altered by the employment of the process and they can therefore be recovered for another use.

With all the variants of the device according to the invention, the Applicant has established that it is possible to make concrete posts of polygonal cross section without the least sagging or the least deformation of the liner, even though made of cardboard, and to obtain finished products of a quality at least equal to that of posts made with the forms of the prior art.

These advantages will clearly appear from the detailed description that follows of various embodiments of the invention. These embodiments relate to the production of posts of square section, but the invention, of course, is not limited to such posts and instead applies to the production of posts having any polygonal cross section.

DETAILED DESCRIPTION OF THE PREFERRED EMBODIMENTS

Figure 1:
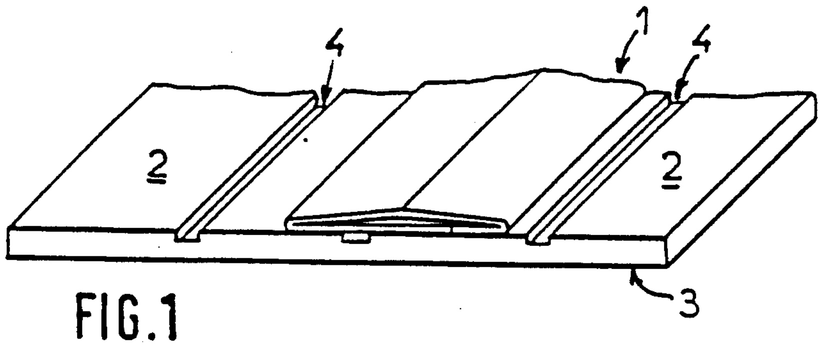
FIGS. 1 and 2 are perspective views of a preassembled liner and backing panels of a first embodiment of the device according to the invention, with the liner represented flat and deployed in position of use, respectively.
Figure 2:
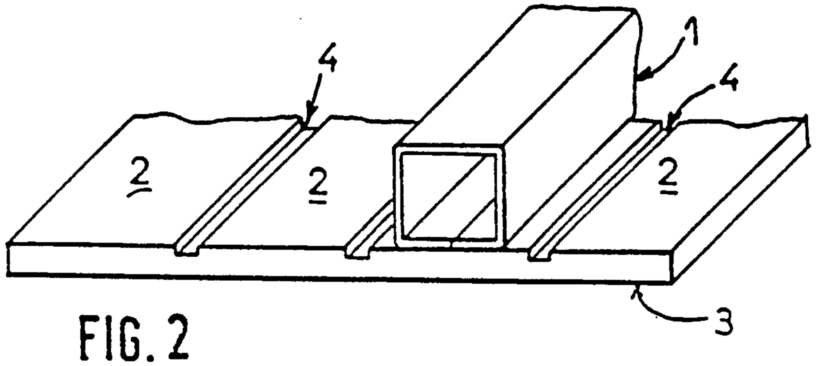
Figure 3:
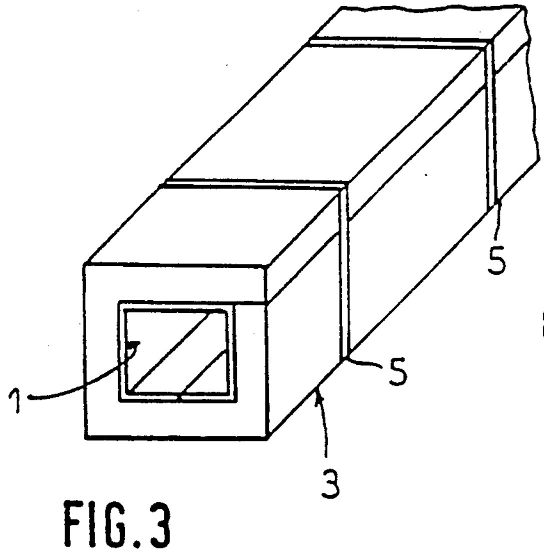
FIG. 3 is a perspective view of the first embodiment in position of use, with the different elements assembled with the aid of strapping.

In the embodiment in FIGS. 1 to 3, the cardboard liner 1 in which the concrete is cast has a square cross section and is obtained from a single cardboard blank appropriately cut and scored, while the backing panels 2 of plastic material are also contiguous two by two and form a single panel 3 in which creases 4 define the folding lines. The liner 1 is glued by one of its faces to an element 2 of the panel 3, the glued face having been made, as seen in FIGS. 2 and 3, by bringing the lateral portions of the starting cardboard sheet edge to edge in the same plane.

As represented in the drawings, to bring these elements into the position of use, the cardboard liner 1 is opened up, the corresponding backing panels 2 are folded against its lateral faces to form a transversely closed structure, and these elements are assembled in this position by means of straps 5 of metal or plastic material.

The setting up of the device at a worksite is therefore extremely simple and, as indicated above, after the concrete post has been cast, the liner 1 can be separated from it by tearing it away, while the panel 3 of backing elements 2 and the straps 5 can be recovered and reused for another cycle of operations.

Figure 4:
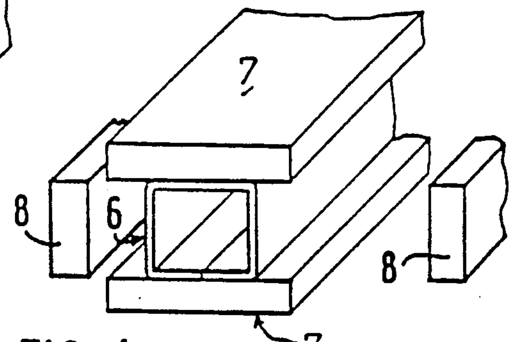
FIG. 4 is an exploded view of another embodiment of the device according to the invention.
Figure 5:
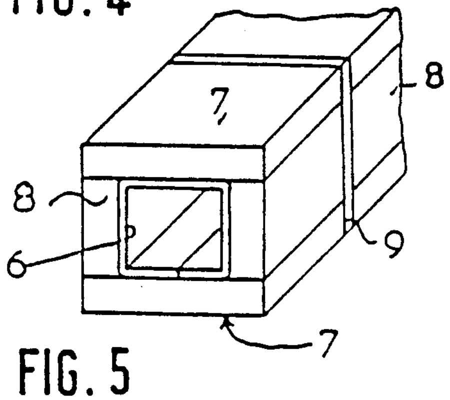
FIG. 5 shows the elements of FIG. 4 assembled in position of use with the aid of strapping.

The same is the case with the embodiment in FIGS. 4 and 5 in which the cardboard liner is similar to the liner 1 described above. On two parallel external faces of this liner 6 there are glued two backing panels 7 of plastic material, which laterally overlap each side of the corresponding face of the liner 6 by a distance equal to the thickness of the panels. It is thus possible to engage between the panels 7 two panels 8 of a width equal to that of the faces of the liner 6, to set them against the two free faces of the liner.

As before, the straps 9 hold the different elements assembled in position of use.

This second embodiment is as simple as the one before, and as easy to use at the worksite. In this second embodiment, likewise, the panels of plastic material 7 and 8 and the straps 9 can be recovered at the end of the fabrication cycle for reuse.

Figure 6:
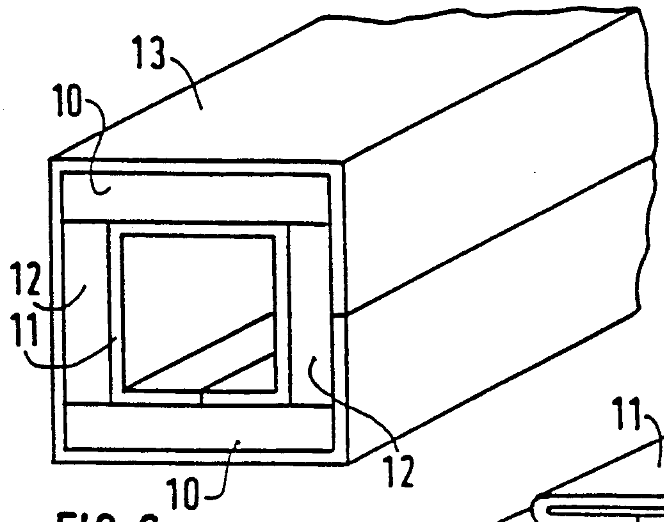
FIG. 6 is a view similar to FIG. 5 of a third embodiment of the device according to the invention.
Figure 9:
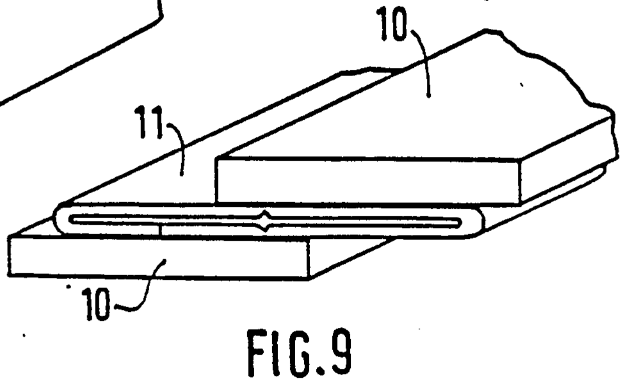
FIGS. 9 and 10 are perspective views of the parts of FIGS. 7 and 8, folded flat.
Figure 7:
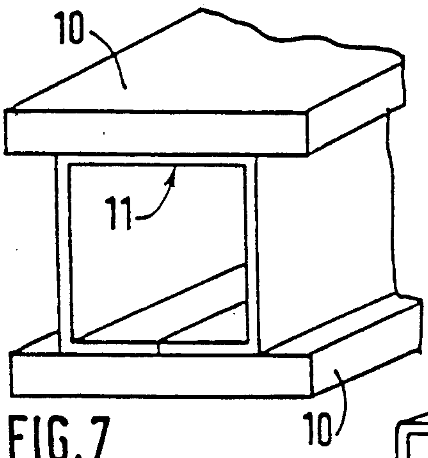
FIGS. 7 and 8 are perspective views of two parts of the embodiment in FIG. 6, in position of assembly.
Figure 10:
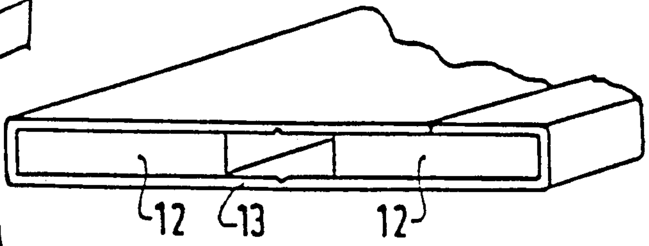
Figure 8:
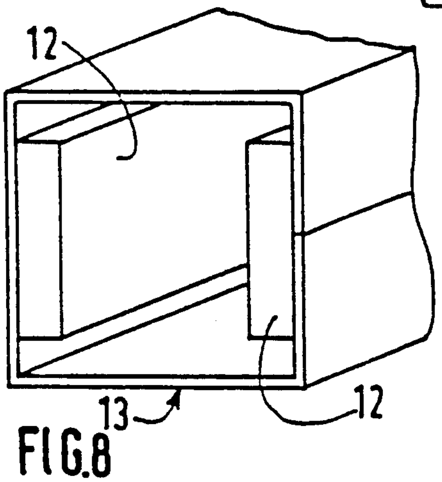

In the variant of FIG. 6, two backing panels 10 of plastic material are also glued onto two parallel external faces of a cardboard liner 11 of square cross section, in which the concrete is poured, but the backing panels 12 which are applied to the other external faces of the liner 11 are glued against the two corresponding internal faces of a second liner 13 in which the liner 11 and the panels 12 can be engaged by sliding. For this purpose, the panels 10 have a width substantially equal to the corresponding internal dimension of the cross section of the liner 13, while the panels 12 have a width substantially equal to the corresponding external dimension of the liner 11.

As can be seen in FIGS. 7 to 10, the liners 11 and 13 equipped, respectively, with the panels 10 and 12 can thus be folded flat and delivered to users or stocked in this form. Unfolding them is performed easily at the worksite, without the need for special tools.

In this variant, the hooping is constituted by the liner 13 itself, but of course metal or plastic straps can be added as in the other embodiments.

The invention therefore provides a simple and easy-to-use means for making concrete posts of polygonal cross section at the worksite.

It will be appreciated that the present invention can be embodied in other specific forms without departing from the spirit or central characteristics thereof. The presently disclosed embodiments are therefore considered in all respect to be illustrative and not restrictive. The scope of the invention is indicated by the appended claims, and all changes that come within the meaning and range of equivalents thereof are intended to be embraced therein.

What is claimed is:

1. A device for the manufacture of posts of concrete having a polygonal cross section, including:

an integral collapsible first liner, having a number of external faces extending between parallel creases, preformed to open in a shape of a right prism, the first liner having an internal section when open identical to that of the post to be manufactured;

backing panels made of one of cardboard, corrugated cardboard, and plastic material, the backing panels being of a number equivalent to the number of external faces of the liner and adapted to be applied against all the external faces of the first liner so that the backing panels entirely cover the external faces of the first liner, wherein the backing panels are distinct from the first liner and at least one of the backing panels is adhered to at least one of the external faces of the first liner; and first hooping means for holding the first liner and the associated backing panels assembled in mutual contact during the manufacture of the concrete posts with the device when the integral first liner is opened in the shape of the right prism.

2. A device according to claim 1, wherein the first liner comprises:

a single blank appropriately sized and provided with the parallel creases, two free borders of the blank parallel with the creasing being substantially in edge-to-edge contact, wherein external first liner surfaces adjacent to the two free borders are glued against a common backing panel and wherein the first liner is collapsible by bending at its creases.

3. A device according to claim 1, wherein the backing panels are a mutually contiguous two-by-two planar structure having zones of lesser thickness which define folding lines to separate different panels, and wherein one external face of the first liner is glued to one of the backing panels.

4. A device according to claim 1, wherein two of the backing panels are adhered to two parallel external faces of the first liner in an opened position, the remaining backing panels being removable and applied to remaining faces of the first liner during use.

5. A device according to claim 4, wherein the first liner is one of rectangular and square cross-section, and wherein the backing panels that are glued to two parallel faces of the first liner laterally overlap with respect to the parallel faces, by a distance substantially equal to a thickness of the remaining panels, and wherein the remaining panels have a width substantially equal to a width of the remaining faces of the first liner.

6. A device according to claim 1, wherein the first hooping means are straps made from one of metal and plastic.

7. A device according to claim 1, wherein two of the backing panels are adhered to two parallel external faces of the first liner, and wherein the remaining backing panels are adhered to internal faces of a second liner, the second liner functioning as the first hooping means; the first liner with its two backing panels being adapted to slideably fit into the second liner having the remaining backing panels adhered thereon.

8. A device according to claim 7, including a second hooping means in the form of straps made from one of metal and plastic.

9. The device of claim 1 wherein the integral first liner is made of one of cardboard, corrugated cardboard, and plastic.

10. A process for the manufacture of posts of concrete having a polygonal cross-section, comprising the steps of:

providing an integral collapsible liner, having a predetermined number of external faces extending between parallel creases, preformed to open in a shape of a right prism and a plurality of backing panels equal in number to the predetermined number of external faces of the liner, at least one of the backing panels being adhered to at least one of the external faces of the first liner;

opening the integral liner into the shape of the right prism with an internal section identical to that of the post to be manufactured;

applying the backing panels made of one of cardboard, corrugated cardboard, and plastic to all the external faces of the first liner to entirely cover all external faces of the liner, the backing panels being distinct from the liner and at least one of the backing panels adhering to at least one of the external faces of the liner;

holding the opened liner and the backing panels in mutual contact with each other with hooping means;

pouring concrete into the liner and allowing the concrete to harden while the backing panels and hooping means prevent the deformation of the liner;

removing the hooping means; and removing the backing panels and the liner from the manufactured concrete post of polygonal cross-section.

11. The process of claim 10, wherein the step of opening the liner includes the step of opening the liner made of one of cardboard, corrugated cardboard, and plastic.

* * * * *